(12) United States Patent
Dai et al.

(10) Patent No.: US 11,090,774 B2
(45) Date of Patent: Aug. 17, 2021

(54) AUTOMATIC ASSEMBLING SYSTEM AND METHOD

(71) Applicant: Tyco Electronics (Shanghai) Co. Ltd., Shanghai (CN)

(72) Inventors: Zhiyong Dai, Shanghai (CN); Lvhai Hu, Shanghai (CN); Yingcong Deng, Shanghai (CN); Lei Zhou, Shanghai (CN); Yun Liu, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 515 days.

(21) Appl. No.: 15/248,619

(22) Filed: Aug. 26, 2016

(65) Prior Publication Data
US 2017/0057025 A1    Mar. 2, 2017

(30) Foreign Application Priority Data
Aug. 28, 2015 (CN) .......................... 201510540491.3

(51) Int. Cl.
*B23P 19/04* (2006.01)

(52) U.S. Cl.
CPC .................................. *B23P 19/04* (2013.01)

(58) Field of Classification Search
CPC ....................................................... B23P 19/04
See application file for complete search history.

(56) References Cited

U.S. PATENT DOCUMENTS

2011/0048649 A1* 3/2011 Komatsu ............... B23P 19/069
157/1.35

\* cited by examiner

*Primary Examiner* — Moshe Wilensky
(74) *Attorney, Agent, or Firm* — Barley Snyder (57) ABSTRACT

An automatic assembling system has a component tray, an assembly table, a mechanical arm and pressing tool. The mechanical arm includes a rotary disc and a plurality of gripping devices mounted on the rotary disc, wherein the rotary disc is configured to rotate about an axis such that one of the plurality of gripping devices is aligned with a corresponding component disposed on the component tray and grips the corresponding component. The pressing tool is also mounted on the rotary disc and is configured to press and/or adjust an assembled component on the assembly table.

15 Claims, 12 Drawing Sheets

AUTOMATIC ASSEMBLING SYSTEM AND METHOD

CROSS-REFERENCE TO RELATED APPLICATIONS

This application claims the benefit of the filing date under 35 U.S.C. § 119(a)-(d) of Chinese Patent Application No. 201510540491.3 filed Aug. 28, 2015.

FIELD OF THE INVENTION

Embodiments of the invention relate to an automatic assembling system and method, and more specially, to an automatic assembling system and a method based on a mechanical arm and a visual guiding technology, for assembling a housing and components.

BACKGROUND

Currently, for example, assembling of an a housing used in a small form-factor pluggable (SFP) or SPF+ module and a plurality of separate components mounted on the housing is usually carried out manually by operators. The operators need to fix the housing, pick up respective components and assemble the components to the housing in sequence. Such manual operation has low production efficiency, and mistakes in operations occur easily due to the manual operation, which will further decrease the production efficiency.

In order to improve efficiency of assembling separate components, an automatic assembling system is desired. However, it is hard to develop a general assembling system because there are so many kinds of electronic modules.

Moreover, due to a miniaturization trend of modules, assembling of components of a module is a fine operation process. Currently, accurate picking up and assembling of a component during an automatic assembling process is problematic because a mistake or fault in assembling a component may lead to a failure of the whole assembling process, which may influence production efficiency significantly.

A further problem exists in that a light guide mounted on the housing is a flexible component which may be easily twisted and deformed to adversely influence the automatic assembling process.

Therefore, there is a need to provide a general automatic assembling system and a method which are not only suitable for assembling various kinds of modules, but they can also ensure an accurate assembling process and overcome various problems that may occur during the assembling process.

SUMMARY

An object of the invention, among other objects, is to provide an automatic assembling system and a method of using the same, to solve one or more technical problems in prior art as stated above.

In an aspect of the invention, there is provided an automatic assembling system. The automatic assembling system has a component tray, an assembly table, a mechanical arm and pressing tool. The mechanical arm includes a rotary disc and a plurality of gripping devices mounted on the rotary disc, wherein the rotary disc is configured to rotate about an axis such that one of the plurality of gripping devices is aligned with a corresponding component disposed on the component tray and grips the corresponding component. The pressing tool is also mounted on the rotary disc and is configured to press and/or adjust an assembled component on the assembly table.

BRIEF DESCRIPTION OF THE DRAWINGS

Embodiments of the inventions will be described with reference to the accompanying drawings, in which.

DETAILED DESCRIPTION OF THE EMBODIMENTS

Exemplary embodiments of the present disclosure will be described hereinafter in detail with reference to the attached drawings, such that their objects, technical solutions and advantages will be more apparent. The present disclosure may, however, be embodied in many different forms and should not be construed as being limited to the embodiments set forth herein; rather, these embodiments are provided so that the present disclosure will be thorough and complete, and will fully convey the concept of the disclosure to those skilled in the art.

FIGS. 1 to 4 illustratively show an automatic assembling system and its parts according to an embodiment of the invention.

Figure 1:
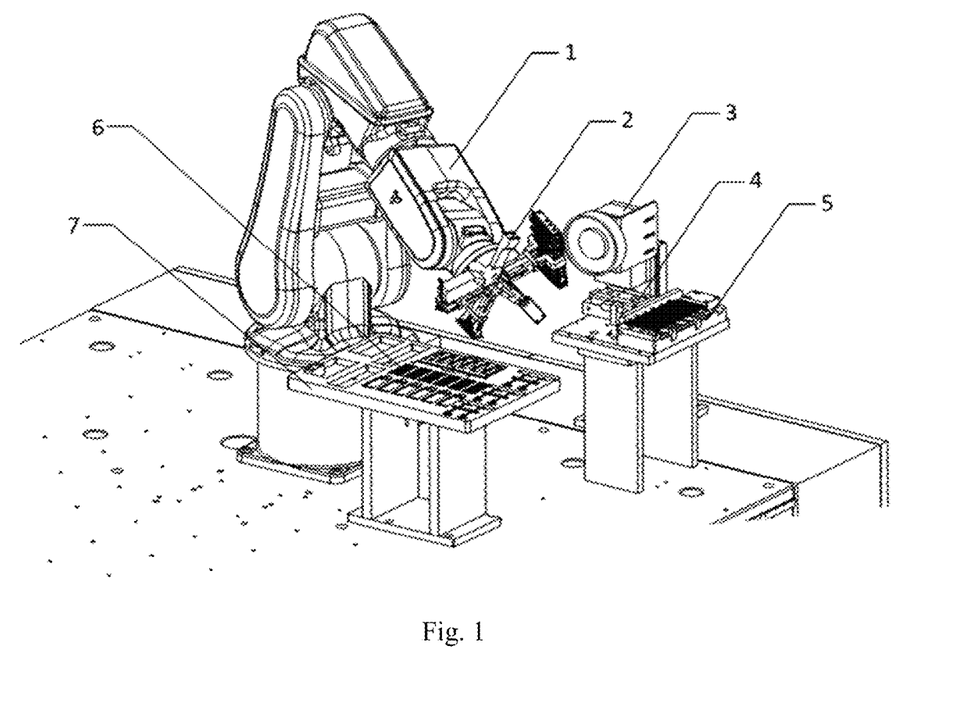
FIG. 1 is a perspective view of an automatic assembling system according to an embodiment of the invention.

As shown in FIG. 1, an automatic assembling system includes a mechanical arm 1, a component tray or material tray 7, an assembly table and an auxiliary positioning device 3. For example, the auxiliary positioning device 3 may be mounted on or near the assembly table.

Figure 2:
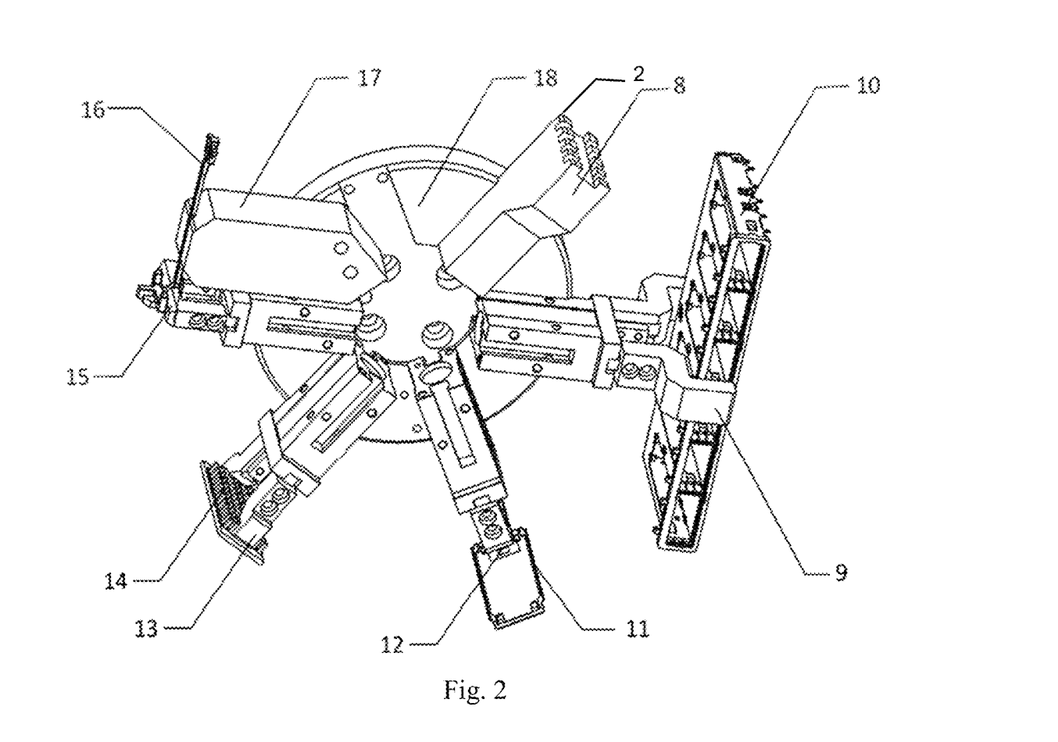
FIG. 2 is a partially enlarged perspective view of the automatic assembling system of FIG. 1, showing a rotary disc and various gripping devices of a mechanical arm.
Figure 3:
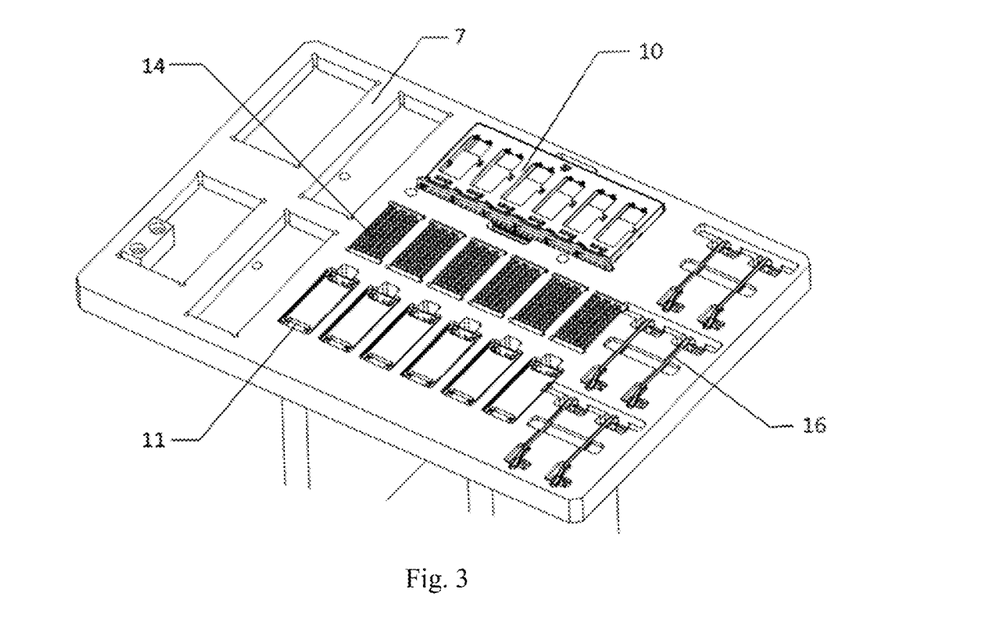
FIG. 3 is a perspective view of a component tray of an automatic assembling system according to an embodiment of the invention.

As shown in FIG. 2, the mechanical arm 1 includes a rotary disc 18 mounted at a front end thereof and a plurality of implements 2 mounted on the rotary disc 18. For example, the implements 2 may include various gripping devices 9, 12, 13 and a pressing tool 8. For example, the gripping devices may include a housing gripping device 9 for gripping a housing 10 of a SFP or SFP+ module, a clamp gripping device 12 for gripping a clamp 11, a heat sink gripping device 13 for gripping a heat sink 14, and light guide gripping devices 15, 17 for gripping a light guide 16.

In an exemplary embodiment, each implement 2 is mounted on the rotary disc 18 in a radial direction, and there is a certain angle between two adjacent implements. For example, the implements may be located on the rotary disc 18 with an identical angular separation. The mechanical arm 1 has a plurality of freedoms of motion, which may be realized through existing movement mechanisms of the mechanical arm 1 and will not be explained in detail. The mechanical arm 1 may rotate the rotary disc 18, and specially, rotate the rotary disc 18 about a horizontal axis. In an exemplary embodiment, the mechanical arm 1 may also include a positioning mechanism (not shown) for controlling the rotation of the rotary disc 18. For example, the positioning mechanism may include a rotation driving mechanism for rotating the rotary disc 18 and a rotation stopping mechanism for stopping the rotary disc 18 at one of a plurality of predetermined angles or orientations, such that one of the gripping devices is aligned with a component disposed on the component tray 7. At each of the predetermined angles, a corresponding implement 2 may be located at a lowermost position of the rotary disc and orientated vertically downward, such that it can conveniently grip a component or assemble a component. At the same time, other unselected implements 2 are rotated to positions that are away from the component tray 7 and relatively higher, such that they will not hinder the selected implement 2 gripping a component from the component tray 7 or assembling the component, and will not interfere with the component tray 7 or the assembly table.

Since the rotary disc 18 is provided with a plurality of implements 2, a plurality of components may be gripped by the plurality of implements 2 at the same time, such that the plurality of components may be transferred simultaneously from the component tray 7 to the assembly table for assembly, thereby reducing the number of times of the rotary disc reciprocates between the component tray 7 and the assembly table.

Figure 5:
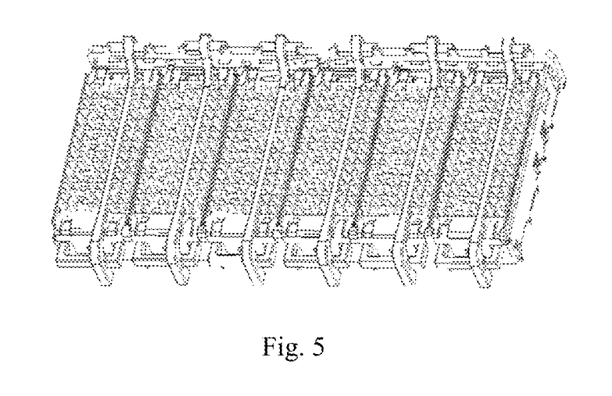
FIG. 5 is a perspective view of a housing of a typical quad small form-factor pluggable (QSFP) module and various components mounted on the housing that can be assembled by the automatic assembling system according to an embodiment of the invention.
Figure 6:
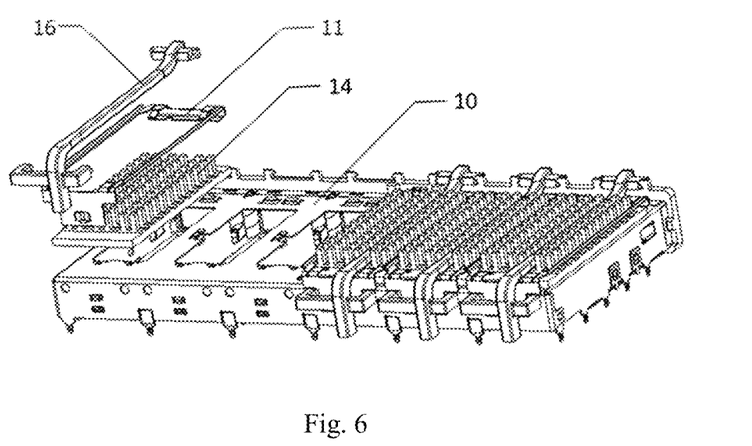
FIG. 6 is a perspective view of a housing of a QSFP module and various components mounted on the housing.

According to an exemplary embodiment of the invention, the automatic assembling system is suitable for assembling a SFP or SFP+ module. FIGS. 5 and 6 show components of a currently typical QSFP module. As shown in FIG. 5, the QSFP module includes N housings arranged side by side in one row, and the housings are provided with various components. FIG. 6 shows a QSFP module with a part of the components disassembled, wherein the N housings 10 are provided with clamps 11, heat sinks 14 and light guides 16. Of course, the automatic assembling system according to this embodiment may also be used to assemble other electronic modules or optical modules.

A detailed process of assembling the QSFP module by using the automatic assembling system according to the embodiment will be described with reference to FIGS. 7-16, wherein FIGS. 7-10 show various implements on the rotary disc 18 of the mechanical arm 1 gripping various components from the component tray, and FIGS. 11-16 show various implements on the rotary disc 18 of the mechanical arm 1 assembling the various components on the assembly table.

The mechanical arm 1 is configured such that the rotary disc 18 is movable between a first position substantially corresponding to the component tray 7 and a second position substantially corresponding to the assembly table. It is to be noted that, each of the first position and the second position is not a specific point, but a region substantially corresponding to the component tray 7 or the assembly table. To properly perform a gripping operation and an assembling operation on a component, location of the rotary disc 18 in the region of the first position and in the region of the second position may be slightly adjusted.

Firstly, the rotary disc 18 is moved by the mechanical arm 1 to a position substantially corresponding to a position of the component tray 7. Before, during or after the movement of the rotary disc 18, the mechanical arm 1 may adjust an orientation of the rotary disc 18, such that the rotary disc 18 is located in a vertical plane. When the rotary disc 18 is moved to a predetermined position, the mechanical arm 1 rotates the rotary disc 18 by a predetermined angle, such that one of the implements 2 mounted on the rotary disc 18 is located vertically downward facing the component tray 7. Then, the implement 2 is utilized to grip a component suitable for being gripped by the implement 2. During this process, relative positions of the implement 2 and the component to be gripped in a horizontal direction may be adjusted through at least one of the following methods: (1) slightly adjusting the position of the rotary disc 18, such that the implement 2 is moved to a position corresponding to the component to be gripped, such adjustment may be realized through adjusting the mechanical arm 1; (2) slightly adjusting a horizontal position of the component tray 7, such that the component to be gripped is moved to a position corresponding to the gripping implement, such adjustment may be realized through providing a suitable movement mechanism between the bracket (FIG. 1) and the component tray 7, for example, a guiding rail or the like; (3) both of the positions of the rotary disc 18 and the component tray 7 are adjusted, which may be realized through an incorporation of the above methods (1) and (2) and a detailed description thereof is omitted herein.

Figure 7:
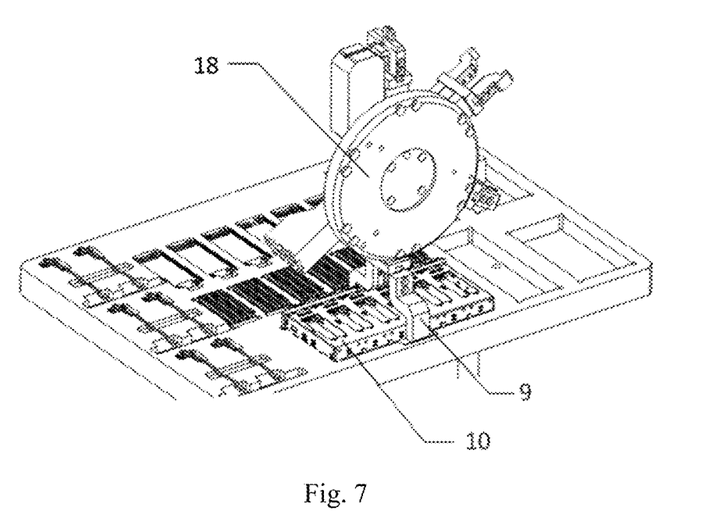
FIG. 7 is a perspective view of a mechanical arm and a component tray, wherein a gripping device of the mechanical arm is gripping the housing from the component tray.

For example, as shown in FIGS. 2 and 7, the rotary disc 18 is rotated such that the housing gripping device 9 (FIG. 2) is located vertically at the lowermost position of the rotary disc 18, and the housing gripping device 9 is moved to a position corresponding to a housing 10. Then, the mechanical arm 1 operates, such that the housing gripping device 9 is lowered to a position where the housing 10 is reachable to grip the housing 10, and after the housing 10 has been gripped, the housing gripping device 9 is moved upward to a height where the housing gripping device 9 will not interfere with subsequent operations.

Figure 8:
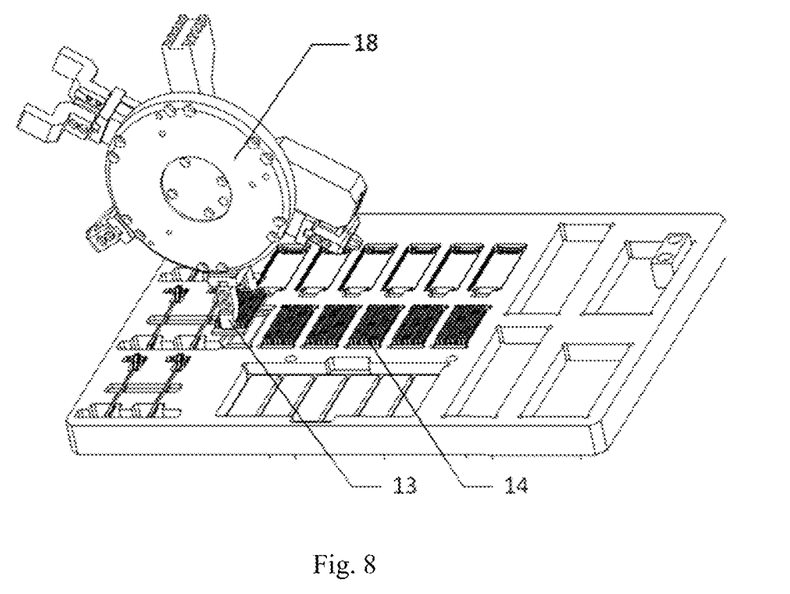
FIG. 8 is a perspective view of the mechanical arm and the component tray, wherein another gripping device of the mechanical arm is gripping a heat sink from the component tray.

Then, for example, as shown in FIGS. 2 and 8, the rotary disc 18 is rotated such that the heat sink gripping device 13 (FIG. 2) is located vertically at the lowermost position of the rotary disc 18, and the heat sink gripping device 13 is moved to a position corresponding to a heat sink 14. Then the mechanical arm 1 operates, such that the heat sink gripping device 13 is lowered to a position where the heat sink 14 is reachable to grip the heat sink 14, and after the heat sink 14 has been gripped, the heat sink gripping device 13 is moved upward to a height where the heat sink gripping device 13 will not interfere with subsequent operations.

Figure 9:
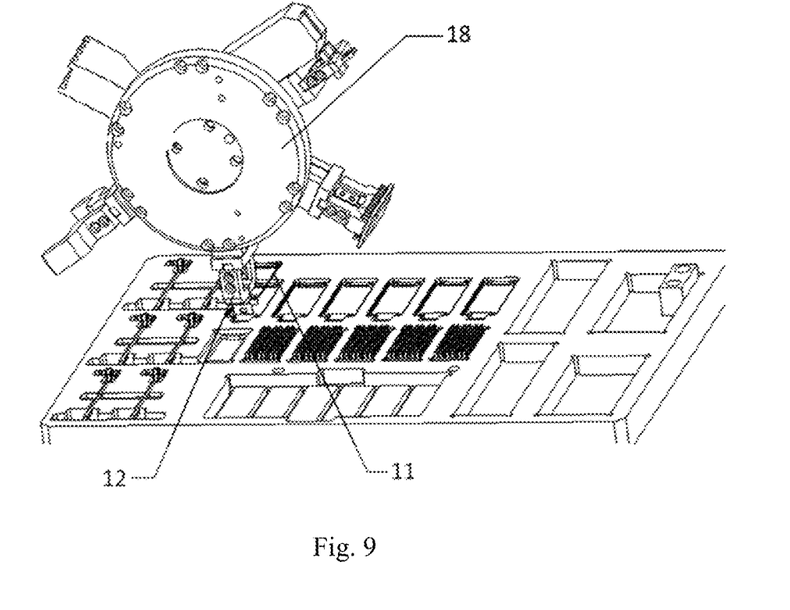
FIG. 9 is a perspective view of the mechanical arm and the component tray, wherein another gripping device of the mechanical arm is gripping a clamp from the component tray.

Then, for example, as shown in FIGS. 2 and 9, the rotary disc 18 is rotated such that the clamp gripping device 12 (FIG. 2) is located vertically at the lowermost position of the rotary disc 18, and the clamp gripping device 12 is moved to a position corresponding to a clamp 11. Then the mechanical arm 1 operates, such that the clamp gripping device 12 is lowered to a position where the clamp 11 is reachable and the clamp 11 is gripped. After the clamp 11 has been gripped, the clamp gripping device 12 is moved upward to a height where the clamp gripping device 12 will not interfere with subsequent operations.

Figure 10:
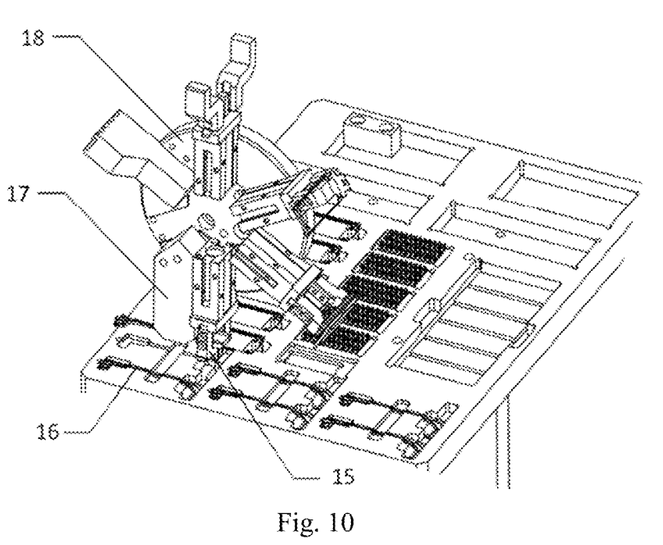
FIG. 10 is a perspective view of the mechanical arm and the component tray, wherein another gripping device of the mechanical arm is gripping a light guide from the component tray.

Then, for example, as shown in FIGS. 2 and 10, the rotary disc 18 is rotated such that the light guide gripping device 15, 17 (FIG. 2) is located vertically at the lowermost position of the rotary disc 18, and the light guide gripping device 15, 17 is moved to a position corresponding to a light guide 16. Then the mechanical arm 1 operates, such that light guide gripping device 15, 17 is lowered to a position where the light guide 16 is reachable to grip the light guide 16, and after the light guide 16 has been gripped, the light guide gripping device 15, 17 is moved upward to a height where the light guide gripping device 15, 17 will not interfere with subsequent operations.

It is to be noted that, in the above description, the housing, the heat sink, the clamp and the light guide are gripped by the mechanical arm 1 in sequence, however, those ordinary skilled in the art would appreciate that these components may be gripped in a different sequence. For example, a component other than the housing may be gripped firstly.

After the components to be assembled have been gripped, the mechanical arm 1 operates such that the rotary disc 18 is moved to a position corresponding or substantially corresponding to the assembly table.

Figure 4:
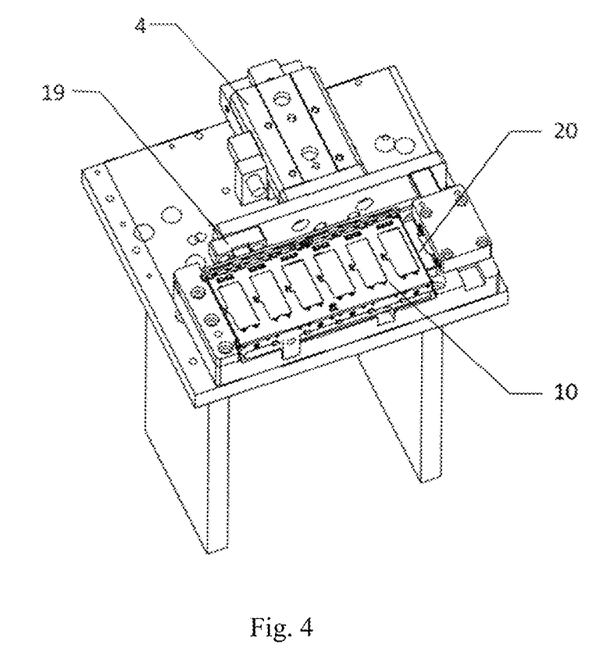
FIG. 4 is a perspective view of an assembly table of an automatic assembling system according to an embodiment of the invention.

Then, the rotary disc 18 rotates, such that the housing gripping device 9 holding the housing 10 is located vertically at the lowermost position of the rotary disc 18. The mechanical arm 1 and the housing gripping device 9 then operates to place the housing 10 in a suitable position on the assembly table. Additionally, as an example, the housing 10 may be fixed on the assembly table through locking mechanisms 19, 20 (FIG. 4) on the assembly table. The locking mechanisms may be provided with a locking force by, for example, an air cylinder or a hydraulic cylinder 4 (FIG. 4). Additionally, as an example, the assembly table is provided with a movement mechanism (not shown) for moving the housing 10 to a suitable position on the assembly table; or, the assembly table may be provided with a movement mechanism underneath the assembly table, such that the assembly table may be moved as a whole. For example, the movement mechanism may include a guiding rail. After the housing 10 is fixed on the assembly table, the mechanical arm 1 manipulates the housing gripping device 9 to release the housing 10 and then move upward to a height where it won't interfere with subsequent operations.

Figure 11:
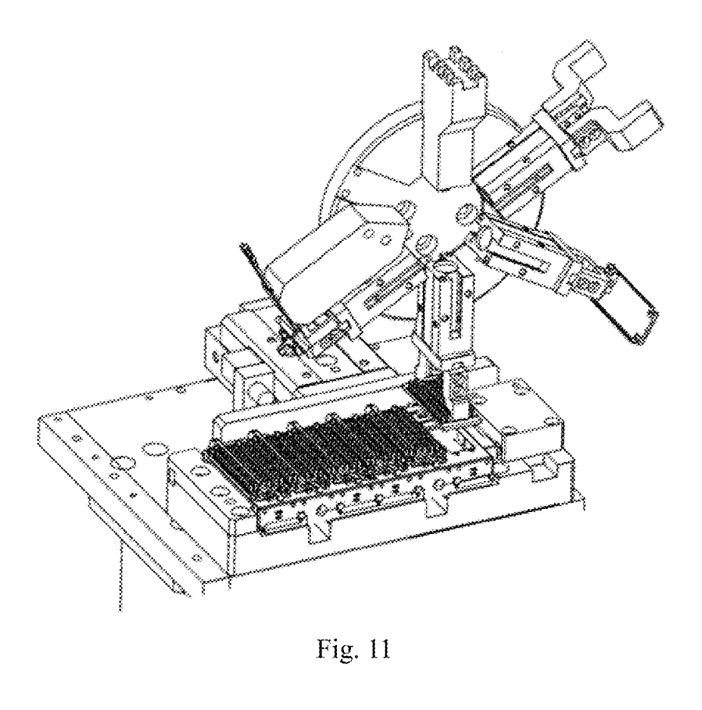
FIG. 11 is a perspective view of a mechanical arm and an assembly table, wherein a gripping device of the mechanical arm is assembling the heat sink to the housing.

Then, the rotary disc 18 rotates, such that the heat sink gripping device 13 holding the heat sink 14 is located vertically at the lowermost position of the rotary disc 18. The mechanical arm 1 and the heat sink gripping device 13 then operates to place or mount the heat sink 14 in a suitable position on the housing 10. After the heat sink 14 is mounted on the housing 10, the mechanical arm 1 manipulates the heat sink gripping device 13 to release the heat sink 14 and then move upward to a height where it won't interfere with subsequent operations.

Figure 12:
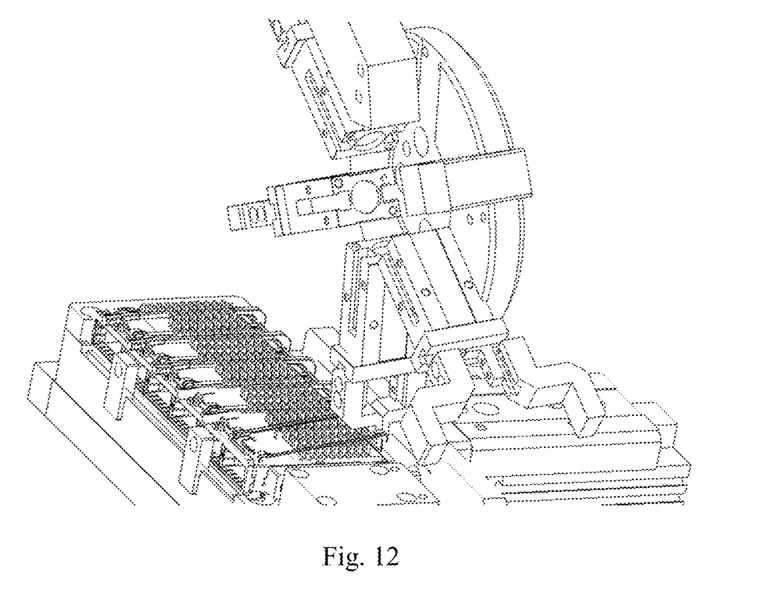
FIG. 12 is a perspective view of the mechanical arm and the assembly table, wherein a gripping device of the mechanical arm is assembling the clamp to the housing.

Then, the rotary disc 18 rotates, such that the clamp gripping device 12 holding the clamp 11 is located vertically at the lowermost position of the rotary disc 18. The mechanical arm 1 and the clamp gripping device 12 then operates to mount the clamp 11 in a suitable position on the housing 10. After the clamp 11 is mounted on the housing 10, the mechanical arm 1 manipulates the clamp gripping device 12 to release the clamp 11 and then move upward to a height where it won't interfere with subsequent operations.

Figure 15:
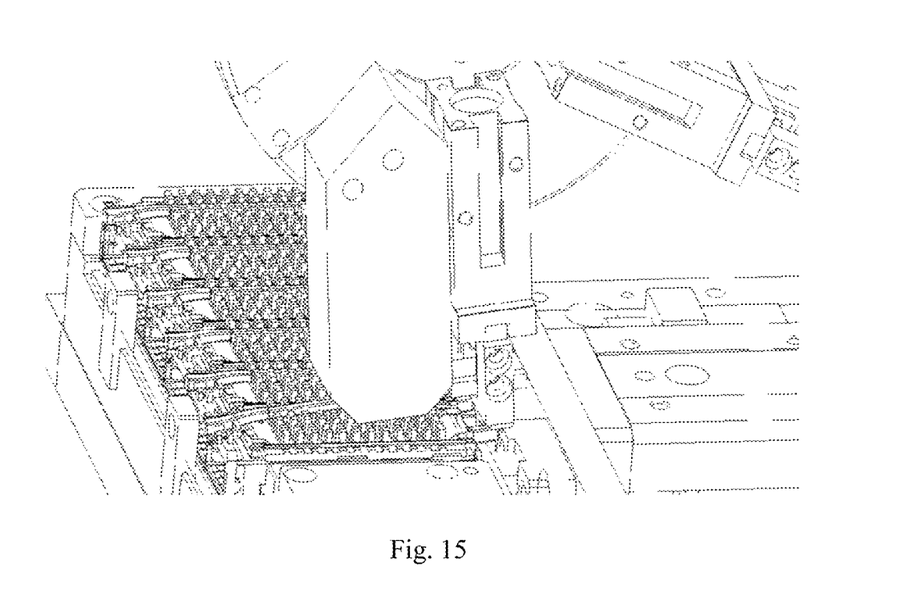
FIG. 15 is a perspective view of the mechanical arm and the assembly table, wherein a gripping device of the mechanical arm is assembling the light guide to the housing.
Figure 16:
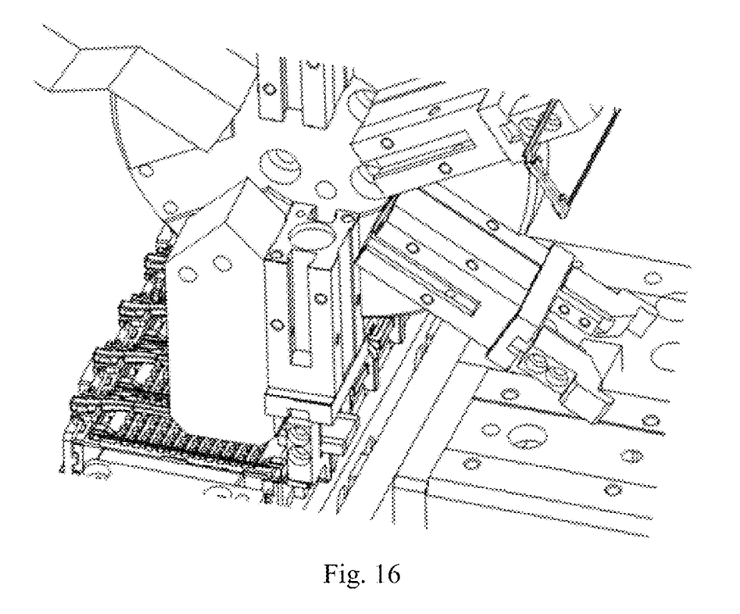
FIG. 16 is a perspective view of the mechanical arm and the assembly table, wherein a gripping device of the mechanical arm is assembling the light guide to the housing.

Then, the rotary disc 18 rotates, such that the light guide gripping device 15 holding the light guide 16 is located vertically at the lowermost position of the rotary disc 18. The mechanical arm 1 and the light guide gripping device 15 then operates to place or mount the light guide 16 in a suitable position on the housing 10. After the light guide 16 is mounted on the housing 10, the mechanical arm 1 manipulates the light guide gripping device 15 to release the light guide 16 and then move upward to a height where it won't interfere with subsequent operations.

With these steps, an exemplary assembling process for the QSFP is completed.

Figure 13:
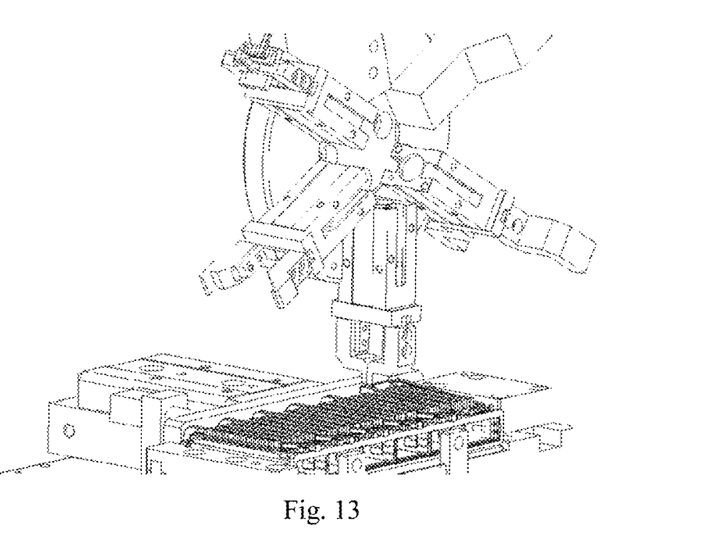
FIG. 13 is a perspective view of the mechanical arm and the assembly table, wherein a gripping device of the mechanical arm is assembling the clamp to the housing.
Figure 14:
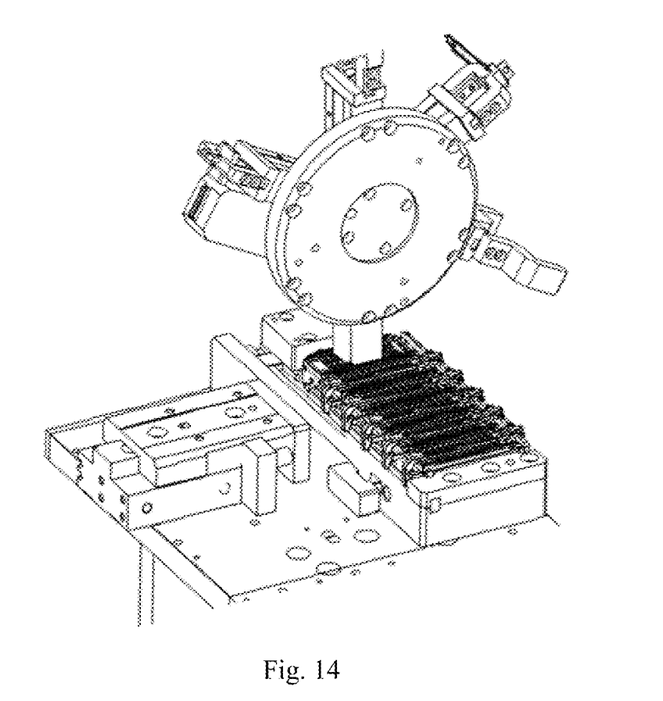
FIG. 14 is a perspective view of the mechanical arm and the assembly table, wherein a pressing tool of the mechanical arm is pressing the heat sink and adjusting the clamp, so as to eliminate a possible interference between the heat sink and the clamp.

As an example, as shown in FIGS. 12 and 13, the clamp 11 may have a special structure, thus, the process of mounting the clamp 11 on the housing 10 may include: gripping a first end of the clamp 11 by the clamp gripping device 12, and inserting a second end of the clamp 11 opposite to the first end into the housing 10 obliquely; releasing the first end of the clamp 11 from the clamp gripping device 12 and moving the clamp gripping device 12 to a position above the first end, then pressing the first end downwards to fix the first end to the housing 10. For example, the first end may be coupled to a part for fixing on a back side of the housing 10.

Figure 17:
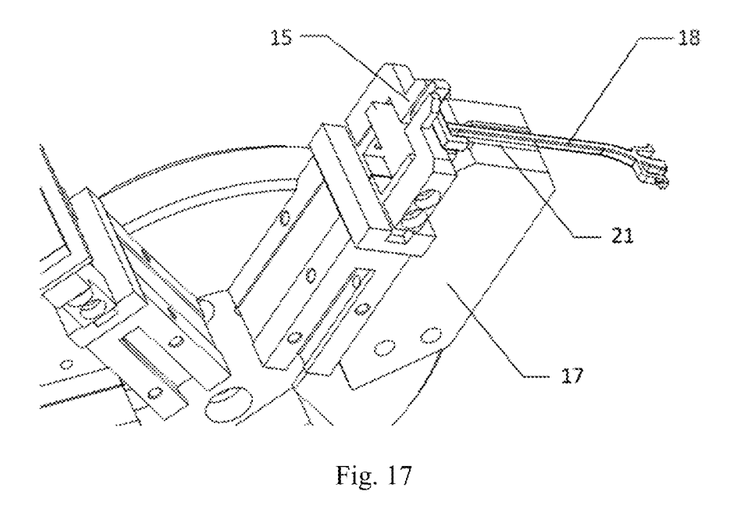
FIG. 17 is a perspective view of a specific structure of a gripping device that is holding a light guide.

As another example, since the light guide 16 has an elongate structure and is a flexible component that can be easily twisted and deformed, the light guide gripping device is correspondingly and specifically designed. As shown in FIGS. 2 and 17, the light guide gripping device includes a gripping portion 15 and a holding portion 17. As shown, the gripping portion 15 and the holding portion 17 are disposed adjacent to each other. The gripping portion 15 is used to grip one end of the light guide, while the holding portion 17 is used to keep the light guide 16 in a desired attitude. For example, a surface of the holding portion 17 may be provided with a slot 21, for receiving and holding at least a portion of the elongate light guide 16 within the slot 21, so as to assist keeping the attitude of the light guide 16. Further, for example, the slot 21 may be provided with a clamper having a certain width, such that the light guide 16 may be clamped within the slot 21 to prevent the light guide 16 from escaping from the slot 21.

Figure 21:
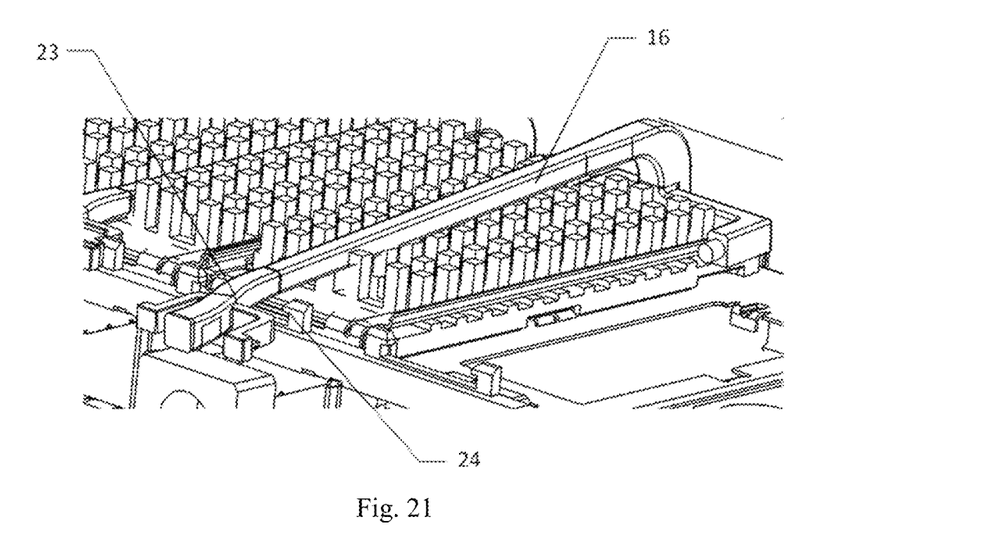
FIGS. 21 and 22 are perspective views showing some details during assembling a light guide.
Figure 22:
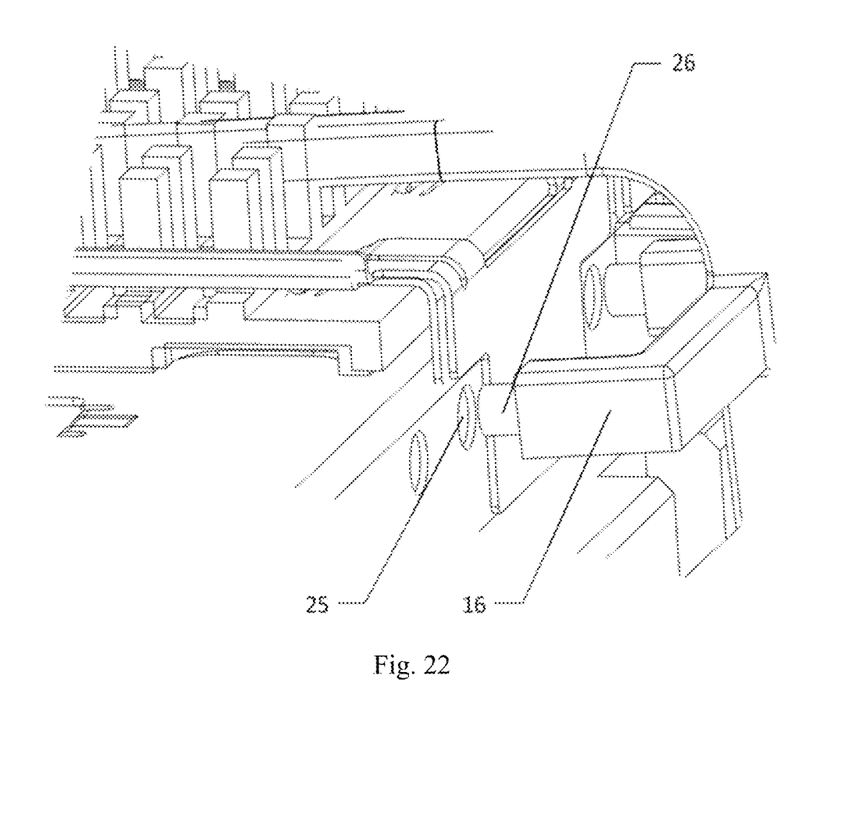

For example, FIGS. 21 and 22 show specific steps and details of assembling the light guide to the housing. As shown in FIG. 21, during assembling the light guide to the housing, firstly, one end 23 of the light guide 16 is gripped by the gripping portion 15 of the light guide gripping device, and the end 23 is inserted into or matches a clamping feature 24 of a front frame of the housing 10, such that the light guide 16 is fixed; then, the light guide gripping device pushes the light guide 16 at a back side of the light guide 16, such that at least one (or for example, two) pin 26 provided on the light guide 16 is inserted into at least one (or for example, two) corresponding opening 25 in the housing 10, so as to finish the mounting of the light guide 16.

Figure 18:
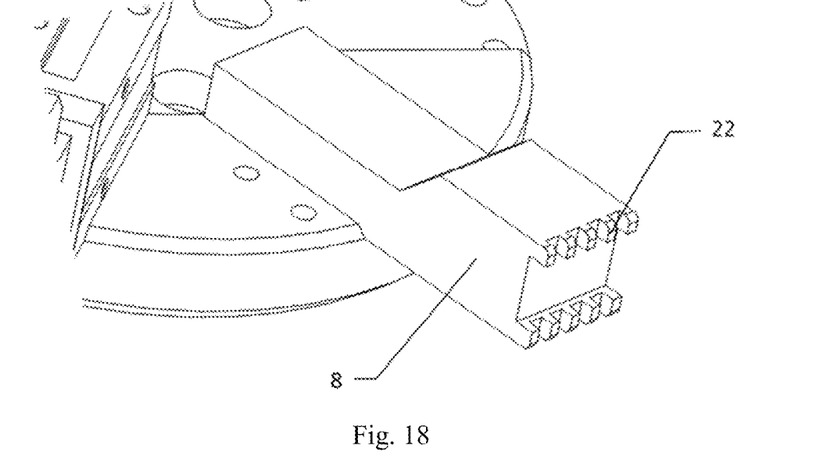
FIG. 18 is a perspective view of a specific structure of a pressing tool of the mechanical arm.

In an exemplary embodiment, after the clamp is mounted to the housing 10, a step of pressing the heat sink 14 by the pressing tool 8 is further provided, so as to eliminate any interference between the heat sink 14 and the clamp 11. Generally, the clamp 11 includes arrangements at either end thereof for fixing the heat sink 14, while two lateral portions of the clamp 11 are located at respective lateral sides of the heat sink 14 and shall not press against or interfere with the lateral portions of the heat sink. In an exemplary embodiment, the pressing tool 8 is designed to have a structure that is suitable for pressing against the heat sink 14. As shown in FIGS. 2 and 18, the pressing tool 8 has a substantially flat bottom surface and a plurality of protrusions 22 disposed on the bottom surface and arranged in two rows. The protrusions 22 are configured to match with the structure of the heat sink 14 and to press the heat sink 14. Specifically, the two rows of protrusions 22 are arranged adjacent to two opposite sides of the pressing tool, and an outer side surface and a top surface of each protrusion 22 are rounded or chamfered. The rounded or chamfered arrangement can not only press the heat sink 14, but also move or adjust the two lateral portions of the clamp 11 laterally, so as to eliminate any possible interference between the heat sink 14 and corresponding clamp 11 during pressing against the heat sink. Of course, shape and configuration of the pressing tool may be otherwise designed such that it can press and adjust other components during assembling the other components.

Figure 19:
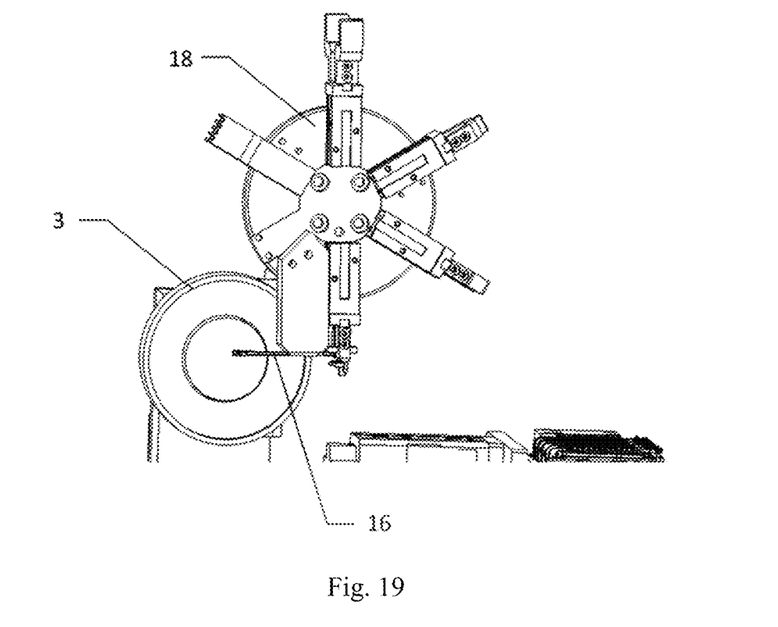
FIG. 19 is a perspective view of a visual inspection device of an automatic assembling system according to an embodiment of the invention, wherein the visual inspection device is inspecting a position of a light guide.
Figure 20:
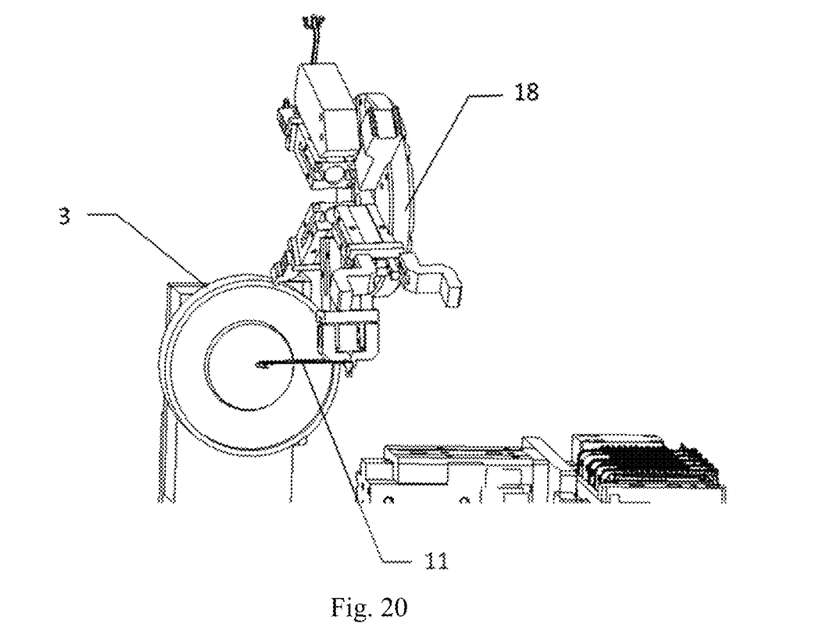
FIG. 20 is a perspective view of a visual inspection device of an automatic assembling system according to an embodiment of the invention, wherein the visual inspection device is inspecting a position of a clamp.

It is to be noted that, during assembling each of the above components, position and orientation of a gripping device or a component gripped by the gripping device need to be determined. Therefore, the above mentioned auxiliary positioning device 3 needs to be used in each of the above operations. For example, the auxiliary positioning device 3 may include a visual auxiliary device. Of course, the auxiliary positioning device 3 may also include other positioning devices, such as a position sensor. As shown in FIGS. 19 and 20, position and orientation of a component may be recognized by the visual auxiliary device, such that the position and the orientation of the component may be suitably adjusted to realize a more precise assembly. In an example, the visual auxiliary device may include a camera for capturing an image of a gripped component and a processor for processing the image captured by the camera and obtaining position information and orientation information of the component from the proceed image. If the component needs to be adjusted, the processor will send a corresponding instruction to the mechanical arm 1, so that the mechanical arm adjusts the position and orientation of the component. FIGS. 19 and 20 show that the auxiliary positioning device is used to recognize positions and orientations of a light guide and a clamp during assembling the light guide and the clamp. In other embodiments that are not shown, another or an additional auxiliary positioning device may be provided adjacent to the component tray or component tray to provide functions of recognizing and locating a type and a position of a gripping device during of process of the gripping device gripping a component.

With the automatic assembling system provided in the above embodiments, at least one of the following beneficial effects may be obtained.

(1) An automated component assembling is achieved, thus the problem that operations can only be performed manually in prior art may be solved.

(2) A plurality of components or various kinds of components to be assembled may be picked up from the component tray at one time by using a plurality of gripping devices on the rotary disc and these components may be assembled on the assembly table in sequence, so as to eliminate a shortcoming that the mechanical arm needs to reciprocate between the component tray and the assembly table, resulting in a low operation efficiency.

(3) With the light guide gripping device having a gripping portion and a holding portion, attitude of a light guide may be maintained during transportation and assembly of the light guide, such that an automatic assembly may be facilitated.

(4) With the auxiliary positioning device such as the visual auxiliary device, a precise positioning and attitude adjustment of a component during transportation and assembly of the component may be realized, such that an automatic assembly may be facilitated.

(5) With the pressing tool provided on the rotary disc, any possible interference between a clamp and a heat sink may be eliminated during assembly thereof, such that the clamp may be manipulated to a proper assembling position.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An automatic assembling system, comprising:
    a component tray for holding a plurality of discrete components including a first component of a first type and a second component of a second type, distinct from the first type;
    an assembly table; and
    an operable mechanical arm comprising a rotary disc mounted at a front end thereof and a plurality of implements mounted on the rotary disc, the plurality of implements include:
        a plurality of gripping devices including a first gripping device mounted on the rotary disc and sized to grip and hold the first component, and a second gripping device mounted on the rotary disc and sized to grip and hold the second component, the first gripping device and the second gripping device each independently gripping and holding a respective one of the first component and the second component; and
        a pressing tool mounted thereon,
    the rotary disc being configured to rotate about an axis such that the first gripping device is aligned with the first component disposed on the component tray and grips the first component, and, after the first component is gripped by the first gripping device, the rotary disc being configured to rotate about the axis such that the second gripping device is aligned with the second component disposed on the component tray and grips the second component, the pressing tool being configured to at least one of press or adjust a component on the assembly table, wherein the plurality of discrete components comprise: a housing; a heat sink; a clamp; and a light guide; each of the plurality of gripping devices being configured to grip at least one of the housing, the heat sink, the clamp or the light guide.

2. The automatic assembling system according to claim 1, further comprising an auxiliary positioning device configured to recognize and locate a position and an orientation of a component during assembly.

3. The automatic assembling system according to claim 2, wherein the auxiliary positioning device comprises a visual auxiliary device for obtaining an image of the component.

4. The automatic assembling system according to claim 3, wherein the auxiliary positioning device obtains position information and orientation information about the component from the image.

5. The automatic assembling system according to claim 1, wherein the pressing tool is configured to press an assembled heat sink and adjust an assembled clamp.

6. The automatic assembling system according to claim 5, wherein the pressing tool has an end surface with a plurality of protrusions provided located thereon.

7. The automatic assembling system according to claim 6, wherein the protrusions are arranged in two rows located adjacent to two opposite sides of the end surface respectively.

8. The automatic assembling system according to claim 6, wherein an outer side of each protrusion is rounded or chamfered.

9. The automatic assembling system according to claim 1, wherein the plurality of gripping devices comprise a light guide gripping device having a gripping portion for gripping an end of the light guide, and a holding portion arranged adjacent the gripping portion and including a slot formed in an end thereof for receiving the light guide, the holding portion configured to maintain the light guide at a desired attitude.

10. The automatic assembling system of claim 1, wherein the mechanical arm simultaneously transports the first component gripped by the first gripping device and the second component gripped by the second gripping device from a location proximate the component tray to a location proximate the assembly table.

11. An assembling system, comprising:
a component tray for holding a heat sink and a clamp;
an assembly table; and
a mechanical arm comprising:
   a rotary disc;
   a first gripping device mounted on the rotary disc and configured to grip the heat sink;
   a second gripping device mounted on the rotary disc and configured to grip the clamp independently from an operation of the first gripping device; and
   a pressing tool mounted on the rotary disc and configured to engage with a component on the assembly table,
   wherein the rotary disc is configured to selectively rotate about an axis such that one of the first or second of gripping devices is aligned with a corresponding one of the heat sink or the clamp disposed on the component tray.

12. The assembling system according to claim 11, wherein the pressing tool is configured to press an assembled heat sink and adjust an assembled clamp.

13. The assembling system according to claim 12, wherein the pressing tool has an end surface with a plurality of protrusions provided thereon, the plurality of protrusions configured to engage with corresponding features of the heat sink.

14. The assembling system according to claim 13, wherein an outer side of each protrusion is rounded or chamfered for engaging with a portion of the clamp.

15. An assembling system, comprising:
a component tray for holding a first component including a light guide and a second component;
an assembly table; and
a mechanical arm comprising:
   a rotary disc;
   a first light guide gripping device including:
      a gripping portion for gripping an end of a light guide; and
      a holding portion arranged adjacent the gripping portion and including a slot formed in an end thereof for receiving the light guide, the holding portion configured to maintain the light guide at a desired attitude;
   a second gripping device mounted on the rotary disc and configured to grip the second component independently from an operation of the first light guide gripping device; and
   a pressing tool mounted on the rotary disc and configured to engage with a component on the assembly table,
   wherein the rotary disc is configured to selectively rotate about an axis such that one of the first or second of gripping devices is aligned with a corresponding component disposed on the component tray.

* * * * *